United States Patent [19]
Sato et al.

[11] Patent Number: 5,227,777
[45] Date of Patent: Jul. 13, 1993

[54] RADIO PAGING RECEIVER FOR INTERMITTENTLY RECEIVING A PAGING SIGNAL TRANSMITTED ON DIFFERENT PHASES OF A CLOCK

[75] Inventors: Toshifumi Sato; Mafumi Miyashita, both of Tokyo, Japan

[73] Assignee: NEC Corporation, Tokyo, Japan

[21] Appl. No.: 807,648

[22] Filed: Dec. 16, 1991

Related U.S. Application Data

[63] Continuation of Ser. No. 446,892, Dec. 6, 1989, abandoned.

[30] Foreign Application Priority Data

Dec. 6, 1988 [JP] Japan .................. 63-306837

[51] Int. Cl.[5] .............................. H04Q 1/00
[52] U.S. Cl. ..................... 340/825.44; 340/825.2; 455/343
[58] Field of Search ........... 340/825.44, 825.2, 825.21, 340/311.1; 455/343; 370/84, 100.1, 105.1, 105.3

[56] References Cited

U.S. PATENT DOCUMENTS 4,745,408 5/1988 Nagata et al. .................. 340/825.44
4,802,192 1/1989 Eto et al. ........................... 340/825.2
4,837,854 6/1989 Oyagi et al. ........................ 455/343
4,839,639 6/1989 Sato et al. .......................... 455/343

FOREIGN PATENT DOCUMENTS 516389 3/1980 Australia .
534890 10/1981 Australia .
568332 8/1984 Australia .
0234201 9/1987 European Pat. Off. .
81000800 3/1981 PCT Int'l Appl. .
2144565 3/1985 United Kingdom .

Primary Examiner—Donald J. Yusko
Assistant Examiner—Brian Zimmerman
Attorney, Agent, or Firm—Sughrue, Mion, Zinn, Macpeak & Seas

[57] ABSTRACT

A radio paging receiver of this invention includes a decoder section. The decoder section includes a bit synchronization circuit, a preamble detector, a synchronization signal detector, an address detector, and a reception controller. The preamble detector checks a preamble signal in a plurality of phases of the clock extracted by a bit synchronization circuit, and outputs a preamble detection signal when the preamble signal is detected in at least one phase.

5 Claims, 14 Drawing Sheets

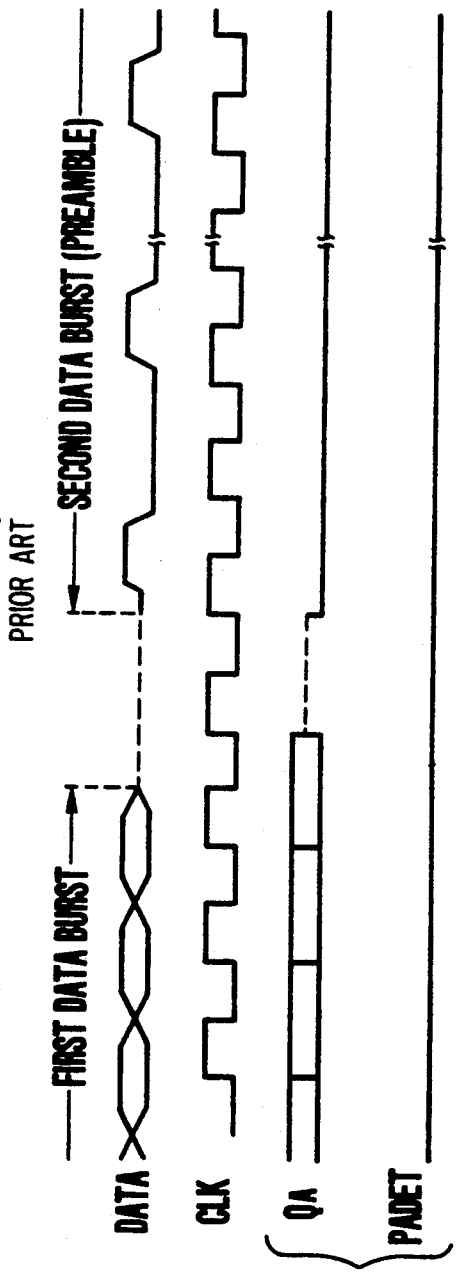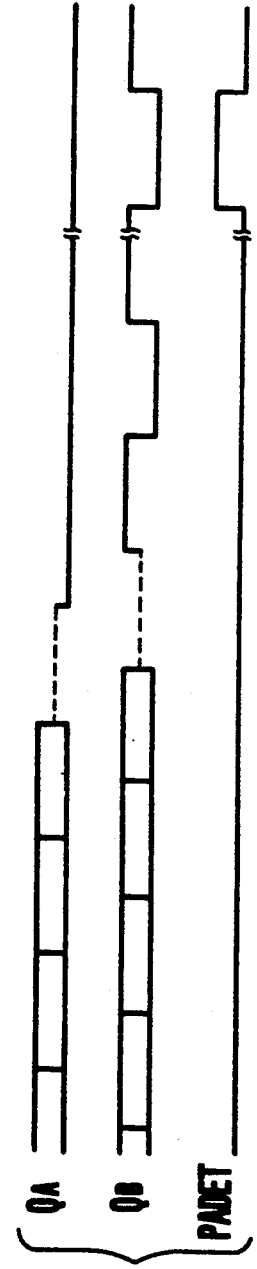

RADIO PAGING RECEIVER FOR INTERMITTENTLY RECEIVING A PAGING SIGNAL TRANSMITTED ON DIFFERENT PHASES OF A CLOCK

This is a continuation of application No. 07/446,892 filed Dec. 6, 1989 now abandoned.

BACKGROUND OF THE INVENTION

The present invention relates to a decoder in a radio paging receiver and, more particularly, to a preamble detector which can detect a preamble in a radio paging signal within a short period of time.

A conventional radio paging receiver comprises a receiving section 201, a decoder section 202, and an alert generator 203, as shown in FIG. 2. The receiving section 201 is intermittently operated in response to a battery saving control signal CONT to reduce power consumption. The decoder section 202 processes received data DATA demodulated by the receiving section 201. When the decoder section 202 detects an address of its own receiver from the received data DATA, it outputs an address detection pulse ADET. The alert generator 203 performs an alert operation using a speaker, an LED, and the like in response to the address detection pulse ADET.

The format of a paging signal consists of a preamble (PA) comprising a repetitive pattern of "1" and "0" signals, and a plurality of batches which follow the preamble, as shown in FIG. 6, as recommended in, e.g, the CCIR (CCIR RPC No. 1, also called a POCSAG code). One batch includes one synchronization signal (SC) and eight frames. An address signal is sent as a codeword in a predetermined frame.

In order to receive the paging signal described above, the decoder section 202 (FIG. 2) comprises a bit synchronization circuit 301, a preamble detector 302, a synchronization signal detector 303, an address detector 304, and a reception controller 305, as shown in FIG. 3.

The conventional preamble detector comprises a shift register consisting of D flip-flops 401 to 404, and an AND gate 406, as shown in FIG. 4. More specifically, the preamble detector samples the received data DATA in one phase of a clock CLK extracted by the bit synchronization circuit 301 (FIG. 3) to perform a preamble detection operation.

The operation of the decoder section 202 (FIG. 2) of the conventional paging receiver will be described below. The operation of the decoder section can be classified into three states, i.e., a preamble search mode, a synchronization signal search mode, and an address search mode.

Referring to FIG. 5A, in the preamble (PA) search mode, the receiving section is cyclically turned on (CONT="1"). At this time, the bit synchronization circuit 301 and the preamble detector 302 shown in FIG. 3 are enabled (enable signal BENA=enable signal PAENA="1"). The bit synchronization circuit 301 corrects the phase of a clock to be synchronous with the received signal. The preamble detector 302 samples the received data DATA in response to the clock CLK output from the bit synchronization circuit 301, and checks the presence/absence of the preamble PA.

When the preamble PA is detected (preamble detection pulse PADET="1"), the decoder section 202 (FIG. 2) enters the synchronization signal (SC) search mode. At this time, the reception controller 305 causes the receiving section 201 (FIG. 2) to continuously operate, and enables the synchronization signal detector 303 (enable signal SCENA="1"). When the synchronization signal detector 303 detects the synchronization signal (synchronization signal detection pulse SCDET="1"), frame synchronization is established, and the decoder section 202 enters the address search mode.

In the address search mode, the reception controller 305 causes the receiving section 201 to intermittently operate at timings of frames assigned to its own receiver, and enables the address detector 304 (enable signal AENA="1"). The bit synchronization circuit 301 is enabled when the receiving section 201 is set ON even in the address search mode so as not to miss bit synchronization during long data. In this case, a time constant for clock phase correction is normally set to be large so as to prevent clock phase disturbance caused by noise (BMODE="0") When the address detector 304 detects an address assigned to the receiver, it outputs an address detection pulse (ADET="1"). In response to the address detection pulse, the alert generator 203 (FIG. 2) is enabled, to make the speaker, the LED, and the like operate, thus alerting the user to detection of paging.

When the synchronization signal cannot be detected from a predetermined number of (e.g., two) consecutive paging signals, or when an address code error is detected from consecutive paging signals, it is determined that frame synchronization is missed. Thus, the decoder section is restored to the preamble (PA) search mode. When the preamble is detected, it is also determined that frame synchronization is missed, and the decoder section is restored to the synchronization signal (SC) search mode (U.S. Pat. No. 4,839,639).

In the decoder section of the conventional radio paging receiver, the preamble detector 302 checks the preamble PA in only one phase of the clock output from the bit synchronization circuit 301. Therefore, in the preamble search mode, the decoder section first performs a bit synchronizing operation, and detects a preamble after bit synchronization is established. Therefore, it takes much time until the preamble is detected. In other words, when the receiving section is intermittently operated, the ON time of the receiver ($T_{BS}$ in FIG. 5A) must be increased by a time period necessary for bit synchronization, resulting in poor battery saving efficiency.

As shown in FIG. 5A, when data bursts are consecutively supplied at short intervals ($T_1 <$ < batch length in FIG. 5A), the two bursts normally have different bit phases. For this reason, the conventional preamble detector shown in FIG. 4 may fail to receive the preamble of the second data burst when the duty ratio of the preamble is offset from 50% due to an offset of characteristics of the receiving section, as shown in FIG. 7A. In this case, an address ($A_3$) included in the second burst shown in FIG. 5A cannot often be received.

SUMMARY OF THE INVENTION

It is therefore an object of the present invention to provide a radio paging receiver which can improve battery saving efficiency.

It is another object of the present invention to provide a radio paging receiver which can reliably receive consecutive data bursts.

According to the present invention, there is provided a radio paging receiver which comprises a receiving section for intermittently receiving a paging signal including a preamble signal, a synchronization signal, and an address signal, a decoder section for processing a signal demodulated by the receiving section, and an alert generator for generating an alert signal when the decoder section detects an address signal assigned to the receiver, the decoder section including: bit synchronization means for extracting a clock synchronized with a received signal; preamble detection means for detecting the preamble signal and outputting a preamble detection signal; synchronization signal detection means for detecting the synchronization signal and outputting a synchronization signal detection signal; address signal detection means for detecting the address signal assigned to the receiver and outputting an address detection signal; and reception control means responsive to the preamble detection signal and the synchronization signal detection signal for outputting a battery saving control signal controlling an intermittent reception operation of the receiver and a control signal controlling the bit synchronization means, the preamble detection means, the synchronization signal detection means, and the address detection means, wherein the preamble detection means checks the preamble signal in a plurality of phases of the clock extracted by the bit synchronization means, and outputs the preamble detection signal when the preamble signal is detected in at least one phase.

BRIEF DESCRIPTION OF THE DRAWINGS

FIG. 7A shows timing charts for explaining operation of the conventional preamble detector;

FIG. 7B shows timing charts for explaining the operation of the preamble detector according to the present invention;

DESCRIPTION OF THE PREFERRED EMBODIMENTS

The first embodiment of the present invention will now be described in detail with reference to the accompanying drawings.

Figure 2:
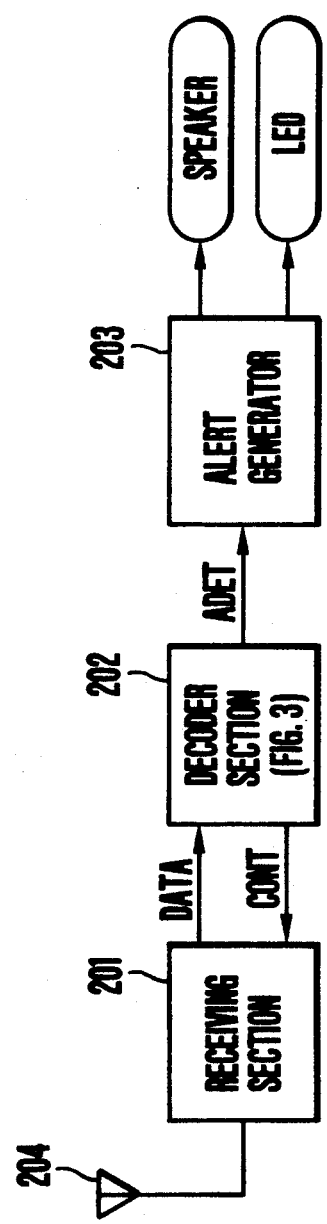
FIG. 2 is a block diagram of a conventional paging receiver to which the present invention is applied.
Figure 3:
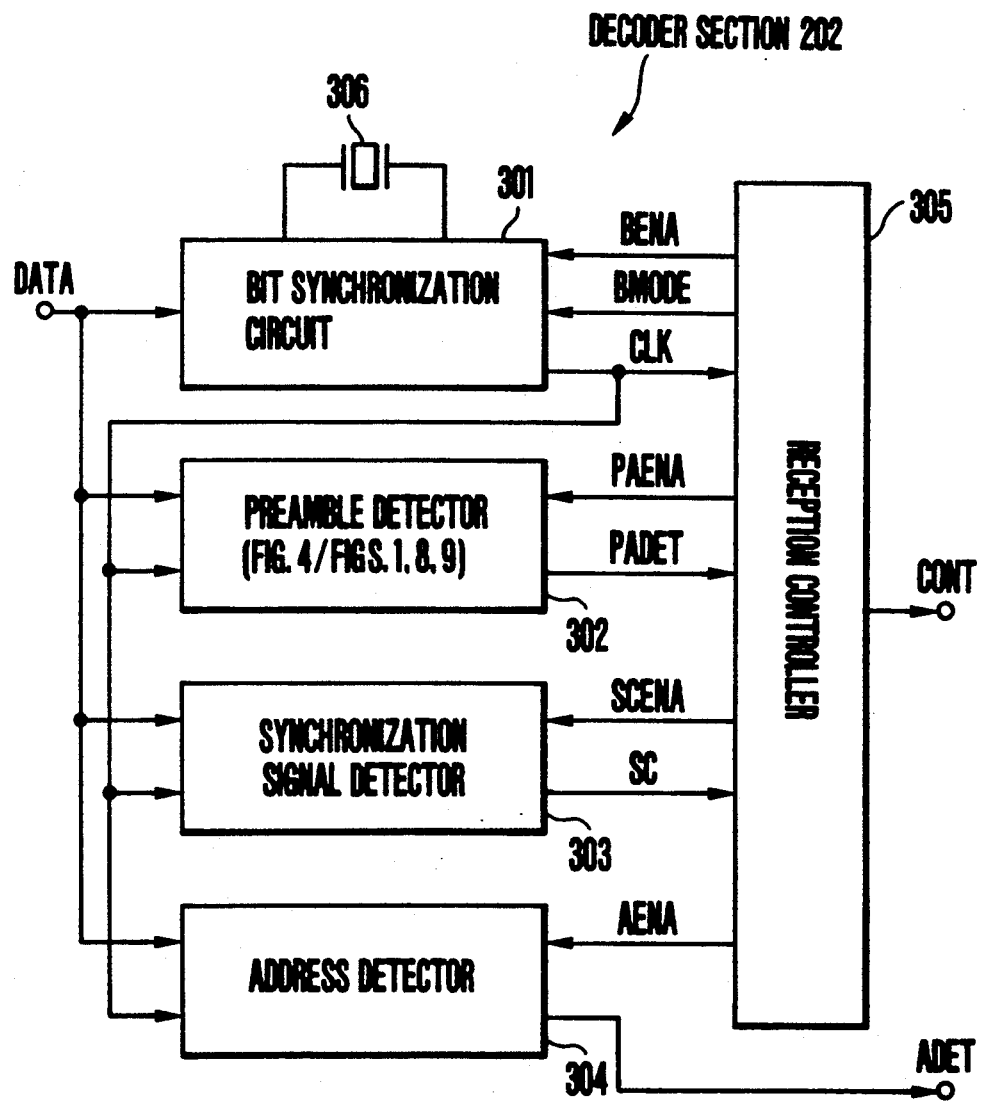
FIG. 3 is a block diagram of a decoder of a paging receiver to which the present invention is applied.

A radio paging receiver according to the present invention has the same arrangement as that shown in FIG. 2, and a decoder section as the principal part of the present invention has substantially the same arrangement as shown in FIG. 3.

However, a preamble detector according to the present invention has a quite different arrangement from that of the preamble detector shown in FIG. 3, as will be described later.

Figure 1:
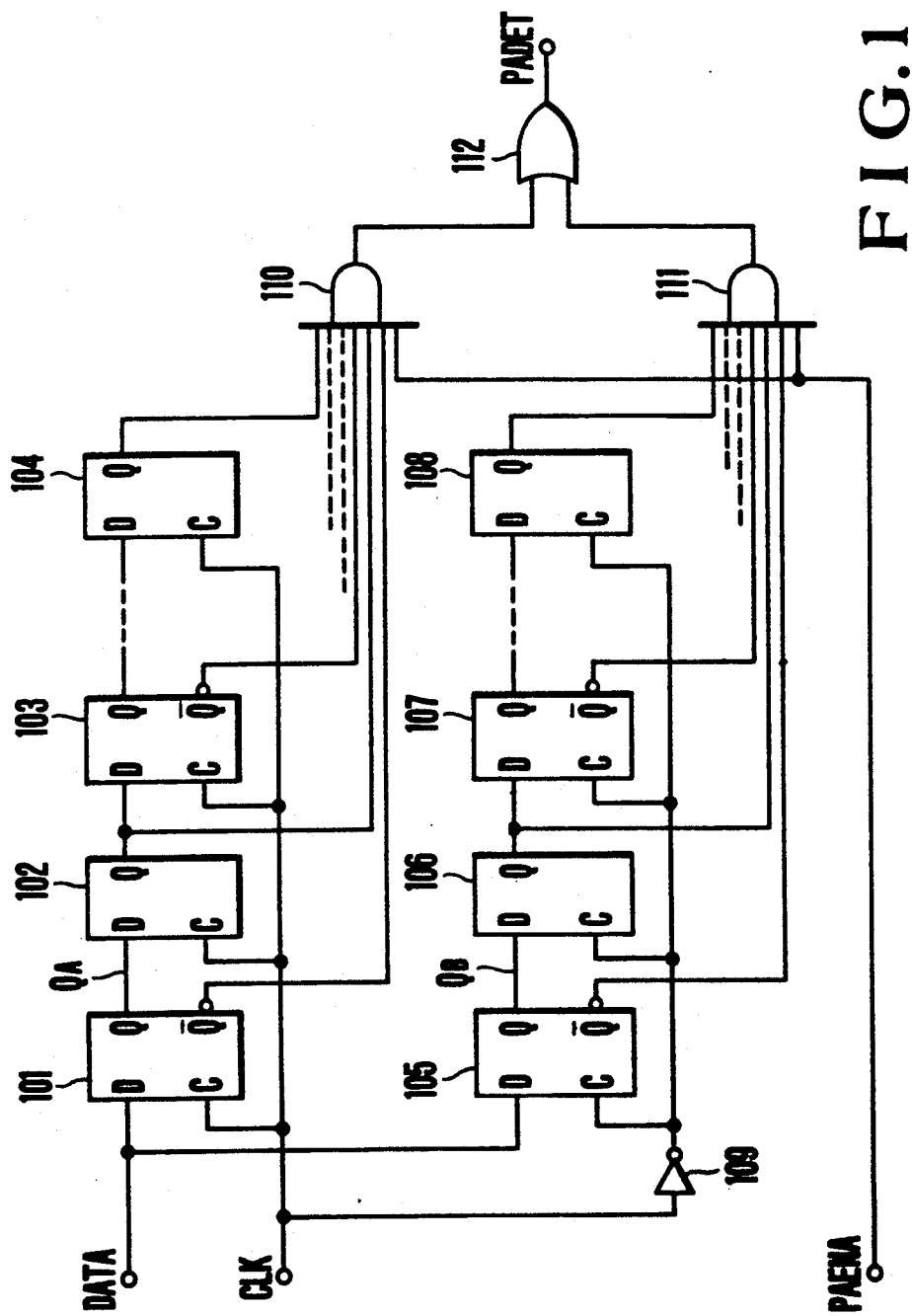
FIG. 1 is a block diagram of a preamble detector according to an embodiment of the present invention.

For these reasons, the embodiment of the present invention will be described below with reference to not only FIG. 1 but also FIGS. 2 and 3.

The preamble detector according to this embodiment comprises a first shift register consisting of D flip-flops 101 to 104, a second shift register consisting of D flip-flops 105 to 108, AND gates 110 and 111, and an OR gate 112. More specifically, the preamble detector according to this embodiment has a circuit for sampling received data in a phase different by 180° from a clock CLK extracted by a bit synchronization circuit (FIG. 3) to perform a preamble detection operation in addition to the conventional preamble detector for sampling received data in one phase of the clock CLK extracted by the bit synchronization circuit 301. When the preamble detector detects a preamble in one of these phases, it outputs a preamble detection pulse (PADET).

The operation of the decoder section of the paging receiver according to this embodiment of the present invention will be described below. The operation of the decoder section can be classified into three states, i.e., a preamble search mode, a synchronization signal search mode, and an address search mode.

Figure 5:
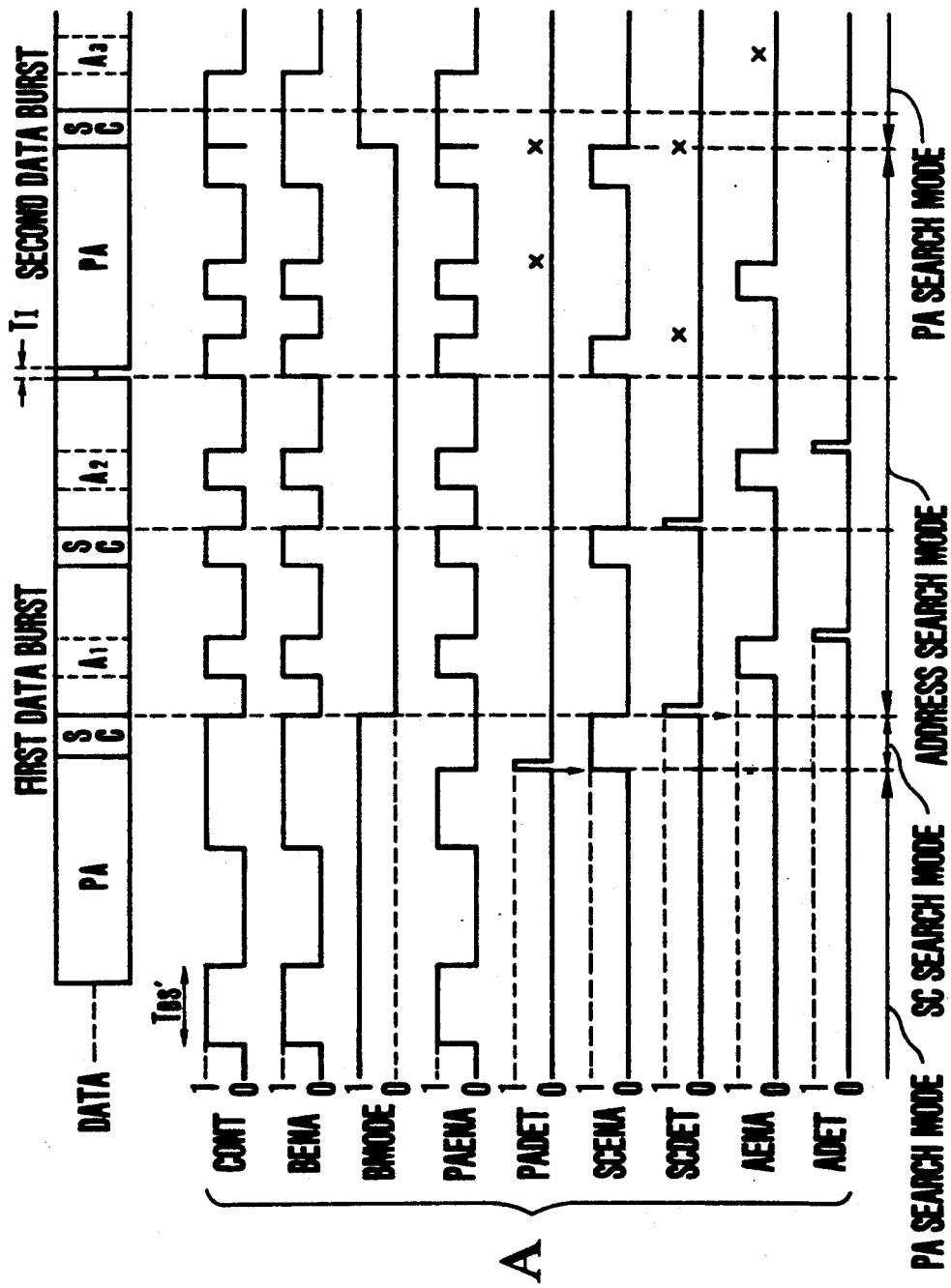
FIG. 5A shows timing charts for explaining the operation of the decoder of the conventional paging receiver.
FIGS. 5B and 5C show timing charts for explaining the operation of a decoder of the paging receiver according to the embodiment of the present invention.
Figure 5B:
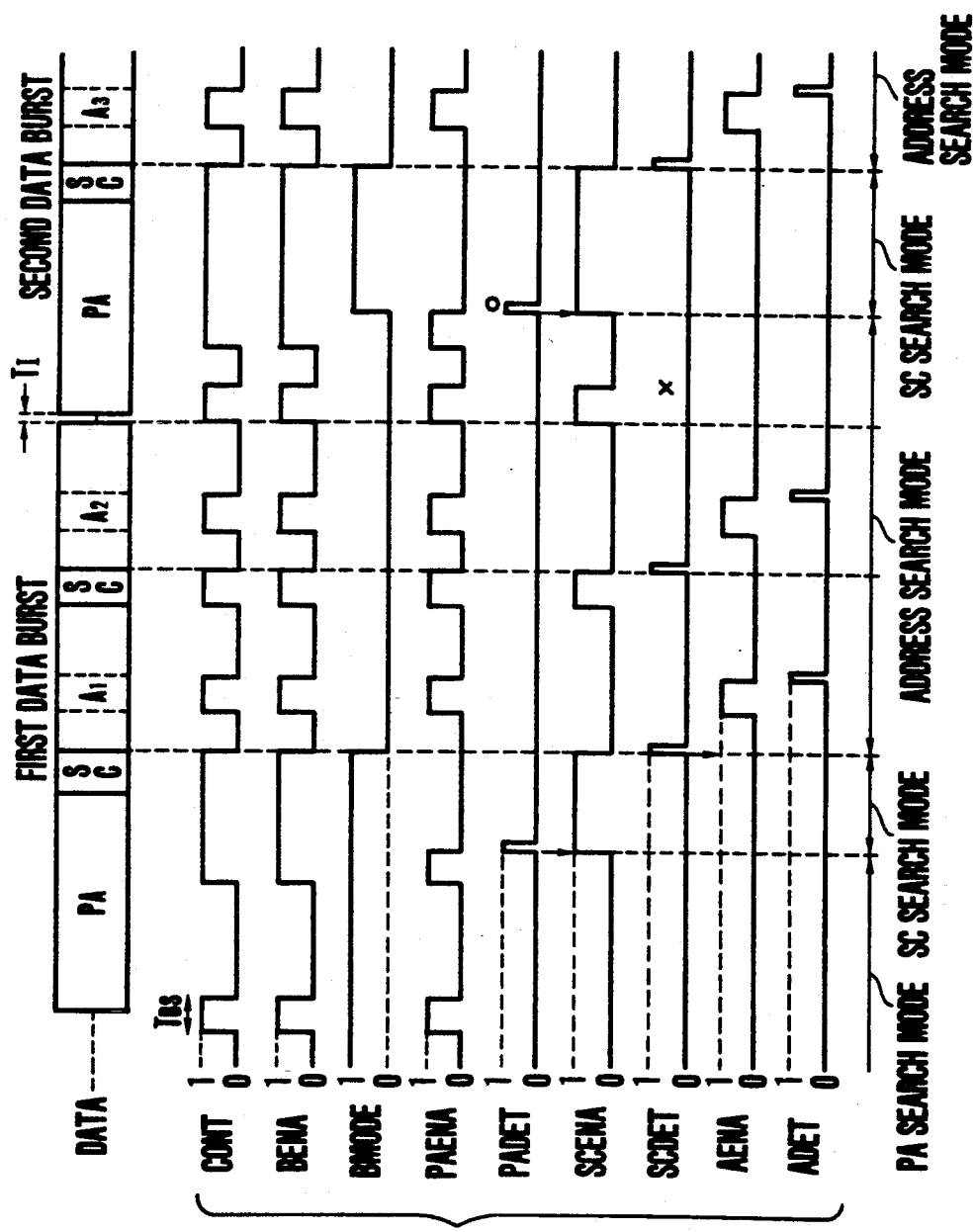

Referring to FIG. 5B, in the preamble search mode, a receiving section 201 is cyclically turned on (battery saving control signal CONT="1"). At this time, the bit synchronization circuit 301 and the preamble detector 302 are enabled (enable signal BENA=enable signal PAENA="1").

The ON time ($T_{BS}$) of the receiving section 201 can be set to be shorter than the ON time ($T_{BS}'$) of the receiving section in the conventional receiver ($T_{BS}$ $T_{BS}'$). The bit synchronization circuit 301 corrects the phase of the clock CLK to be synchronized with received data DATA. The preamble detector 302 samples the received data DATA in two phases of the clock CLK output from the bit synchronization circuit 301 (at the leading and trailing edges of the clock CLK) to check the presence/absence of the preamble.

When the preamble is detected (preamble detection pulse PADET="1"), the decoder section 202 enters the synchronization signal (SC) search mode. At this time, a reception controller 305 causes the receiving section 201 to continuously operate, and enables a synchronization signal detector 303 (enable signal SCENA="1"). When the synchronization signal detector 303 detects the synchronization signal (synchronization signal detection pulse SCDET="1"), frame synchronization is established, and the decoder section 202 enters the address search mode.

In the address search mode, the reception controller 305 causes the receiving section 201 to be intermittently operated at timings of frames assigned to its own receiver, and enables an address receiving circuit 304 (enable signal AENA="1"). The bit synchronization circuit 301 is enabled when the receiving section 201 is set ON so as not to miss bit synchronization during long data. In this case, the time constant for clock phase correction is normally set to be large so as to prevent phase disturbance caused by noise (BMODE="0"). When the address receiving circuit 304 receives the assigned address, it outputs an address detection pulse (ADET="1"). In response to the address detection pulse (ADET), an alert generator 203 is enabled to operate a speaker, an LED, and the like, thus alerting the user to detection of paging.

When the synchronization signal cannot be detected from a predetermined number of (e.g., two) consecutive paging signals, or when an address code error is detected from consecutive paging signals, it is determined that frame synchronization is missed. Thus, the decoder section is restored to the preamble (PA) search mode. When the preamble is detected, it is also determined that frame synchronization is missed, and the decoder section is restored to the synchronization signal (SC) search mode.

Referring to FIG. 7B, first and second data bursts are consecutively sent, and have different bit synchronization timings. When the duty ratio of the preamble is offset by offset characteristics of the receiving section, in the preamble detector of the present invention, the shift register fetches all "0"s like in the conventional receiver at the leading edge of the clock, and cannot detect the preamble. However, the shift register which samples data at the trailing edge of the clock can correctly fetch "1", "0", . . . , data, and can detect the preamble (PADET=1). As described above, when the preamble is detected in the address search mode, the decoder section enters the synchronization signal search mode. Therefore, as shown in FIG. 5B, correct synchronization can also be established for the second burst. Therefore, an address ($A_3$) included in the second data burst can be reliably detected unlike in the conventional decoder section.

As described above, in a decoder section of the radio paging receiver according to the first embodiment of the present invention, the preamble detector checks a preamble in a plurality of phases of a clock extracted by the bit synchronization circuit. When the preamble is detected in at least one phase, the preamble detector outputs the preamble detection pulse, and can detect the preamble even if bit synchronization is not established. Thus, battery saving efficiency can be improved, and consecutively input data busts can be reliably received.

The second embodiment of the present invention will be described below with reference to FIGS. 8 to 10. In this embodiment, the preamble detector 302 shown in FIG. 3 is divided into two circuits to check a preamble of received data in a plurality of phases of a clock.

Figure 4:
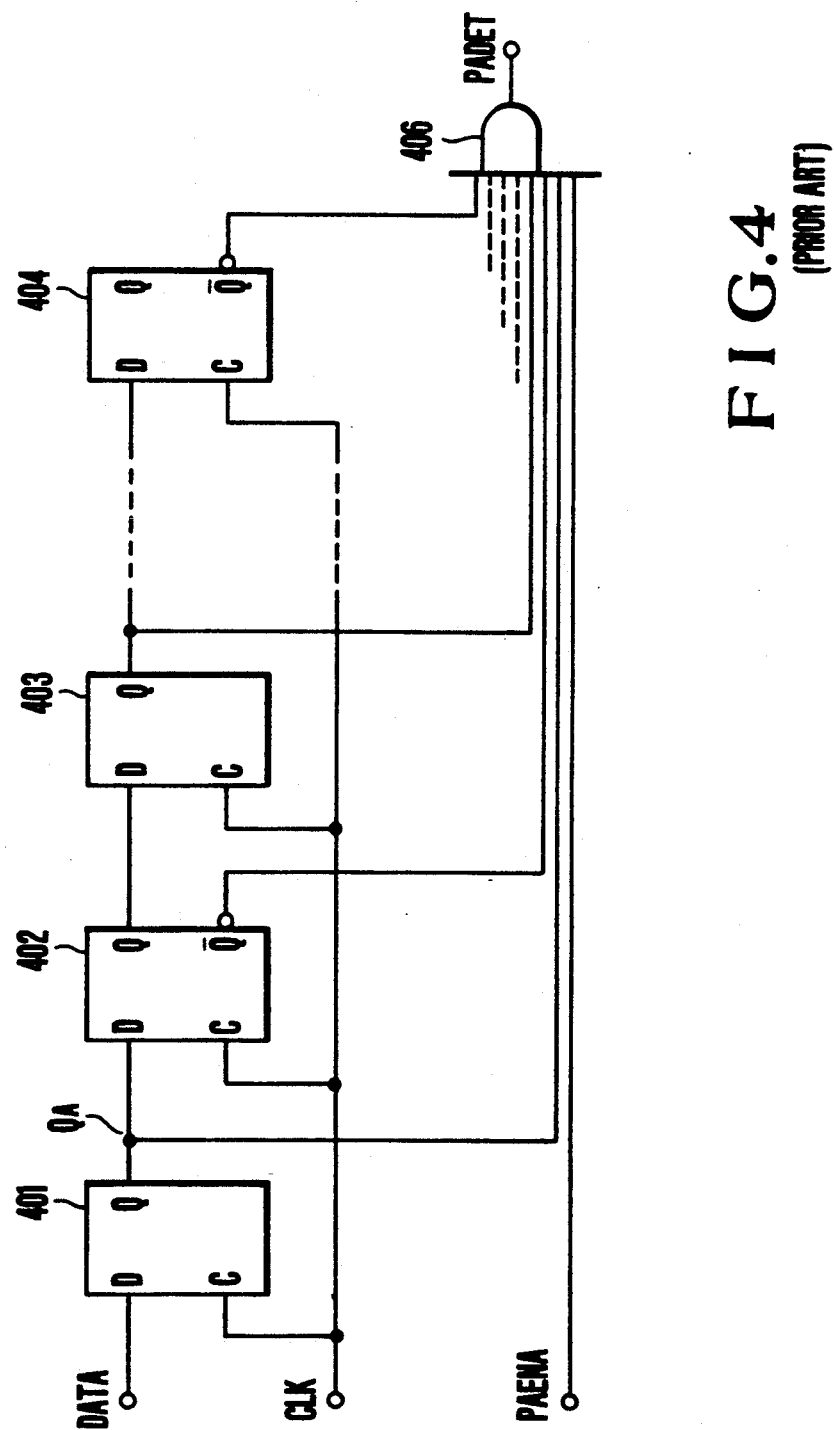
FIG. 4 is a block diagram of a conventional preamble detector.
Figure 8:
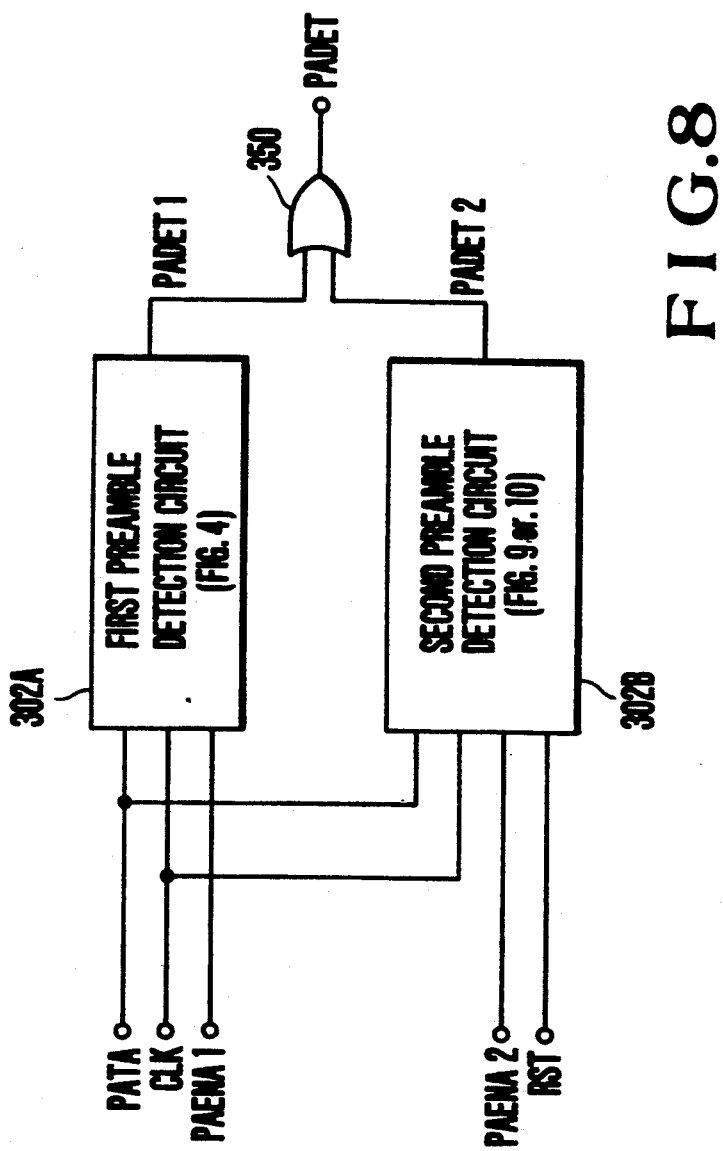
FIG. 8 is a block diagram of a preamble detector according to another embodiment of the present invention.

FIG. 8 shows a preamble detector of the second embodiment. The preamble detector shown in FIG. 8 comprises first and second preamble detection circuits 302A and 302B, and an OR gate 350. In this case, the first preamble detection circuit 302A has the same arrangement as the conventional circuit shown in FIG. 4. The second preamble detection circuit 302B is constituted by a circuit shown in FIG. 9.

Figure 9:
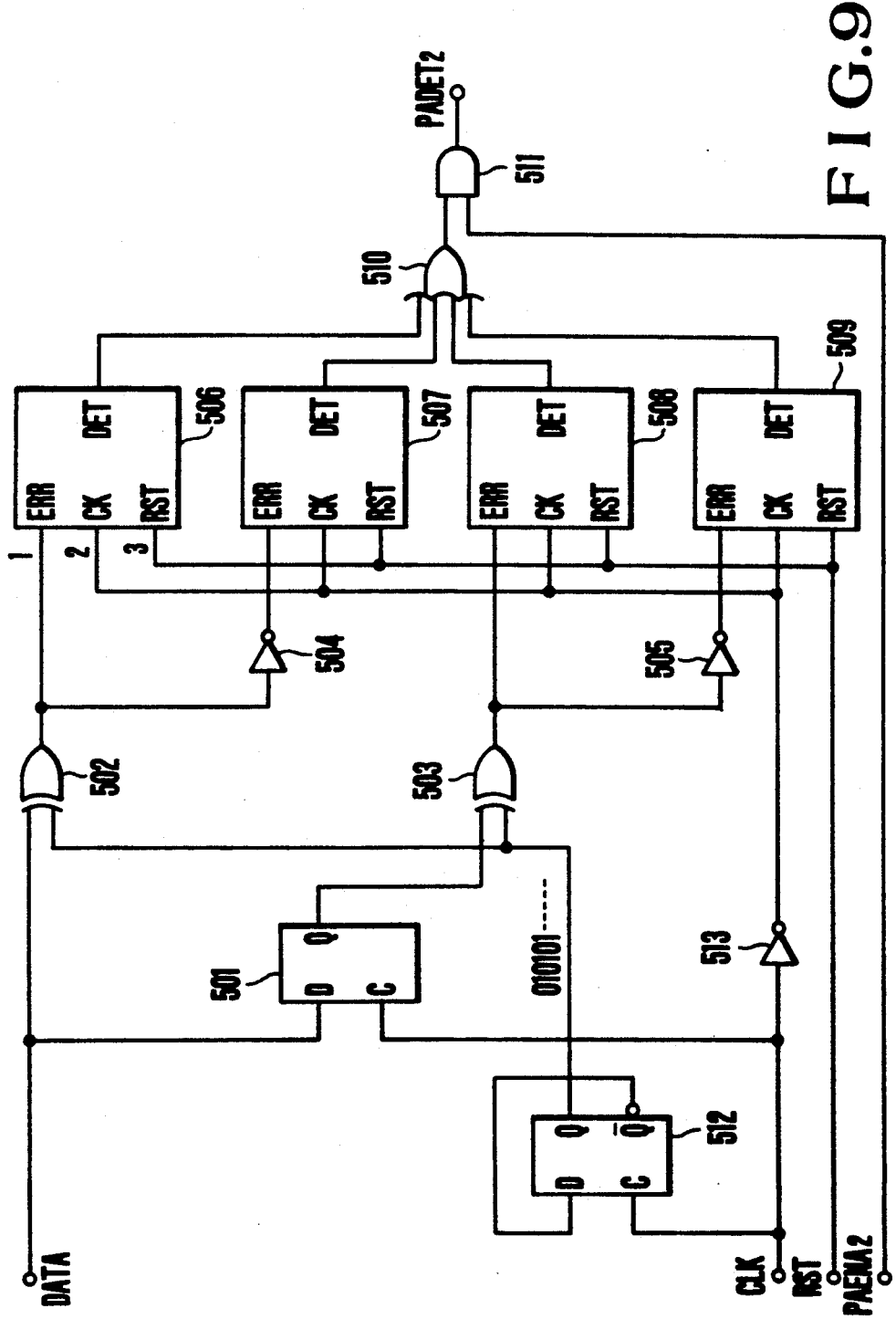
FIG. 9 is a circuit diagram of a second preamble detection circuit shown in FIG. 8.

In FIG. 9, reference numerals 501 and 512 denote D flip-flops; 502 and 503, exclusive OR gates; 504 and 505, inverters; 510, an OR gate; 511, an AND gate; and 506 to 509, error counters for counting the number of bits noncoinciding with the preamble. Each of these error counters 506 to 509 has the arrangement as shown in FIG. 10.

Figure 10:
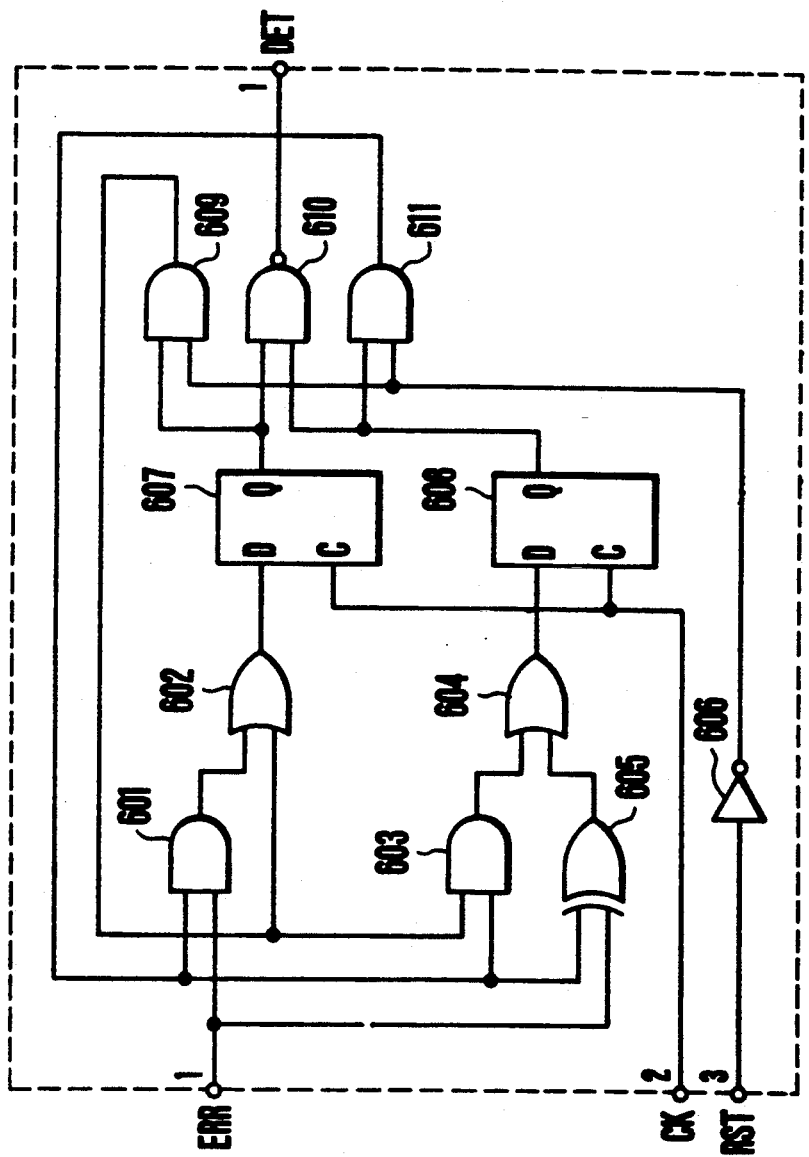
FIG. 10 is a circuit diagram of an error counter shown in FIG. 9.

In FIG. 10, reference numerals 607 and 608 denote D flip-flops; 605, an exclusive OR gate; 606, an inverter; 602 and 604, OR gates; 601, 603, 609, and 611, AND gates; and 610, a NAND gate.

FIG. 10 shows a counter for judging whether or not an error count is 2 or less. An input terminal ERR receives "1" when there is an error; "0" when there is no error. An input terminal RST receives "1" when the error count stored in the flip-flops 607 and 608 is cleared.

The signals to the terminals ERR and RST are input in synchronism with a clock input from the input terminal CK. The flip-flops 607 and 608 store an error count. The flip-flop 607 indicates the units digit, and the flip-flop 608 indicates the tens digit.

Every time "1" is input to the terminal ERR, the flip-flops 607 and 608 are counted up like 0→1→2→3 by the gates 601 to 605. Even when "1" is input to the terminal ERR when the error count=3, the count "3" is maintained. Therefore, an output terminal DET outputs "1" when neither the flip-flops 608 nor 607 indicate "1" (error count of 3 or more), i.e., when the error count is 2 or less.

The operation of the circuit shown in FIG. 8 will be described below. The D flip-flop 512 (FIG. 9) generates a Q output corresponding to a preamble pattern (0101 . . . ) on the basis of a clock CLK. The exclusive OR gate 502 compares received data DATA with the preamble pattern generated by the D flip-flop 512. The error counter 506 counts the number of noncoincidences between the received data DATA and the preamble pattern (0101 . . . ) from the D flip-flop 512, and outputs a DET pulse when the error count is equal to or smaller than 2. The error counter 507 counts the number of noncoincidences between the received data DATA and a pattern (1010 . . . ) inverted by the inverter 504, and outputs a DET pulse when the error count is equal to or smaller than 2 like in the error counter 506. The D flip-flop 501 fetches the received data DATA at the timing of the clock CLK, and shifts the received data DATA by a half-bit time. The exclusive OR gate 503 compares the data shifted by the half-bit time and the preamble pattern (0101 . . . ). For this reason, the exclusive OR gate 503 makes comparison in a phase shifted by 180° from that of the exclusive OR gate 502. The error counters 508 and 509 respectively count the numbers of noncoincidences of the half-bit shifted data with the patterns 0101 . . . and 1010 . . . like in the error counters 506 and 507, and output a DET pulse when the error count is equal to or smaller than 2 like in the error counter 506.

The gates 510 and 511 output a preamble detection pulse $PADET_2$ at a timing of $PAENA_2$="1" when the count of any of the error counters 506 to 509 is equal to or smaller than 2. Note that the gate 511 outputs the pulse $PADET_2$ upon reception of the output from the gate 510 and $PAENA_2$.

Figure 5C:
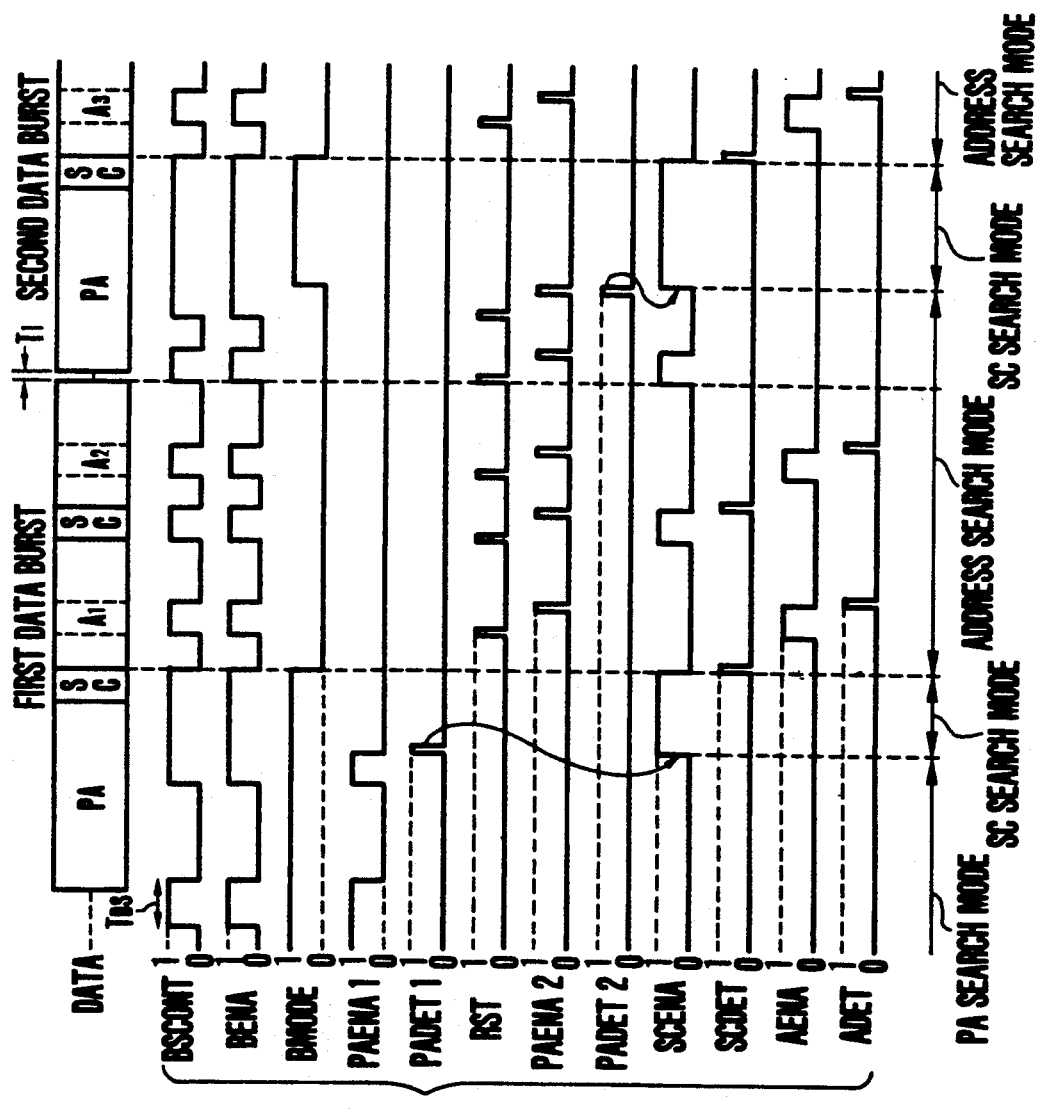
Figure 6:
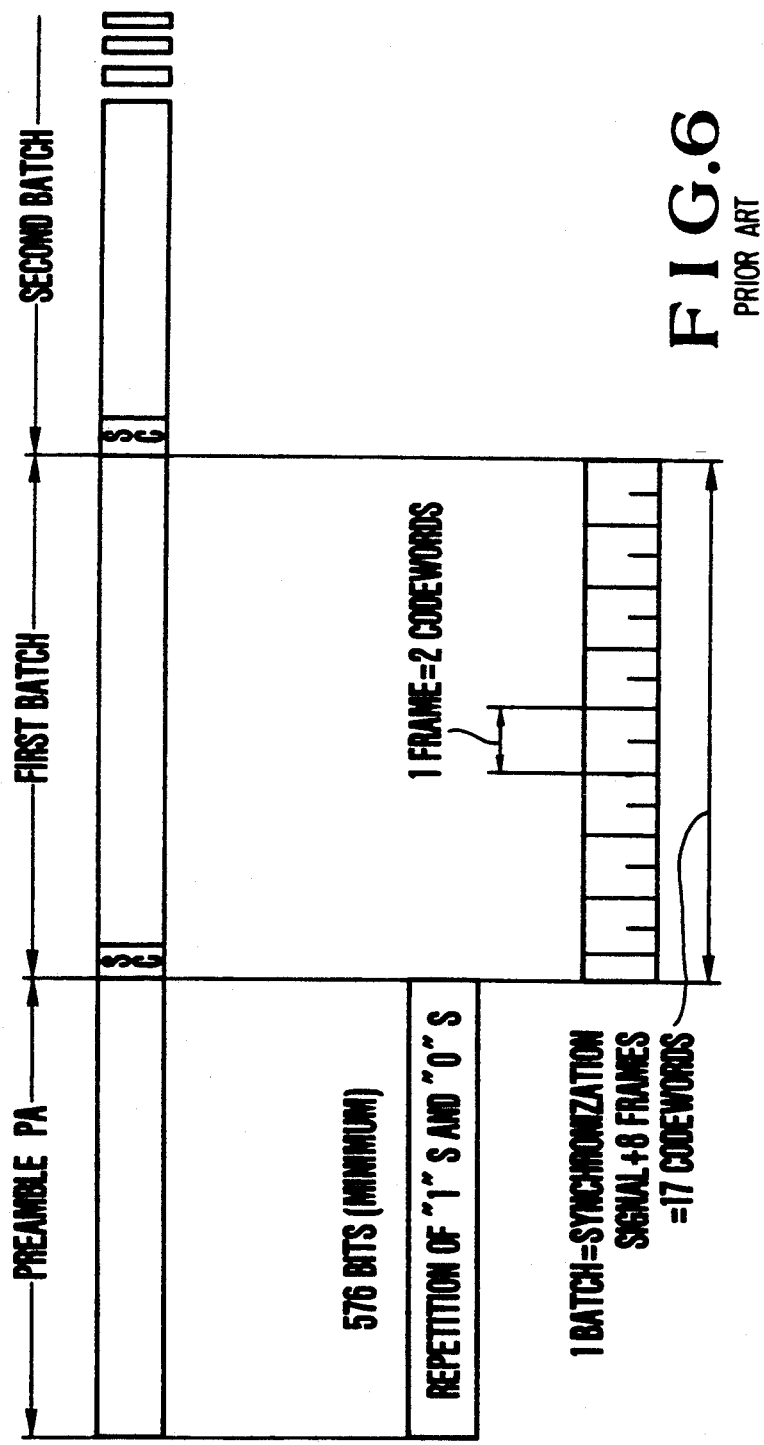
FIG. 6 shows a format of a paging signal (CCIR No. 1 code)

FIG. 5C shows timing charts of signals output in this embodiment. With this arrangement, the number of flip-flops constituting the preamble detector can be decreased as compared to the first embodiment shown in FIG. 1.

In this case, since the first preamble detection circuit 302A has the conventional circuit arrangement, it operates before the synchronization signal SC is detected, as can be seen from FIG. 5C, and the second preamble detection circuit 302B operates after the synchronization signal SC is detected.

Note that the first preamble detection circuit 302A can check the presence/absence of the preamble for every bit, and the second preamble detection circuit 302B can check the presence/absence of the preamble in units of the number of bits of the address signal.

Figure 11:
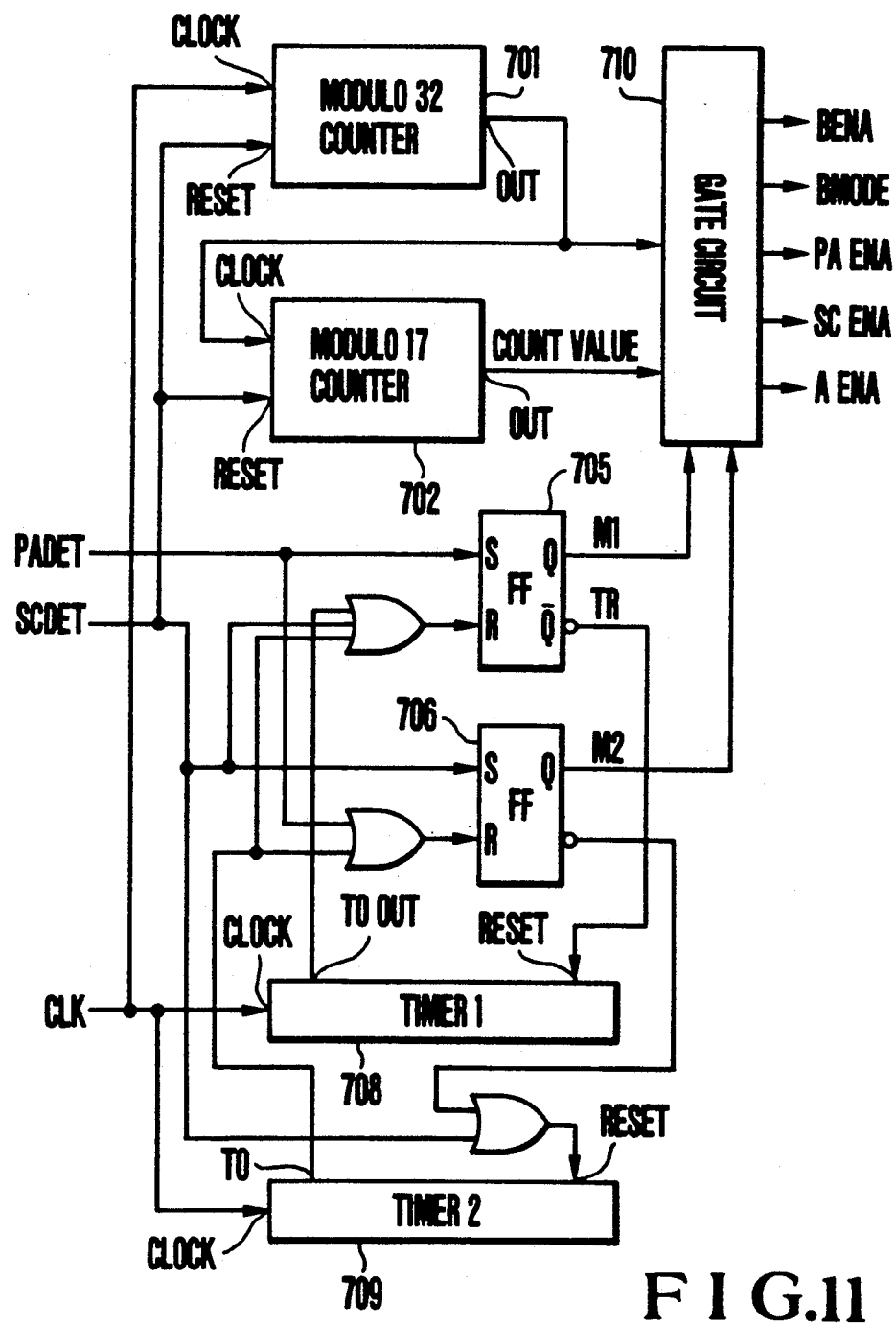
FIG. 11 is a circuit diagram of a reception controller shown in FIG. 3.

FIG. 11 shows an arrangement of the reception controller 305 shown in FIG. 3. In FIG. 11, reference numeral 701 denotes a modulo 32 counter for counting one word, i.e., 32 bits; and 702, a modulo 17 counter for counting one batch, i.e., 17 words.

Reference numerals 705 and 706 denote S-R flip-flops. These flip-flops 705 and 706 perform an operation for discriminating three operation modes, i.e., the preamble (PA) search mode, the SC search mode, and the address search mode.

Reference numerals 708 and 709 denote first and second timers. The first timer 708 outputs a time-out pulse when the SC cannot be detected within a predetermined period of time in the SC search mode. The second timer 709 outputs a time-out pulse when the SC cannot be received within a predetermined period of time. Reference numeral 710 denotes a gate circuit. The gate circuit 710 outputs various control signals in accordance with outputs M1 and M2 of the flip-flops 705 and 706 and the counts of the modulo 32 counter 701 and the modulo 17 counter 702 associated with the operation mode at timings shown in FIGS. 5B and 5C.

In the second embodiment described above, the bit synchronization circuit sets a larger time constant for the clock phase correction after the synchronization signal is detected than that before detection.

Figure 12:
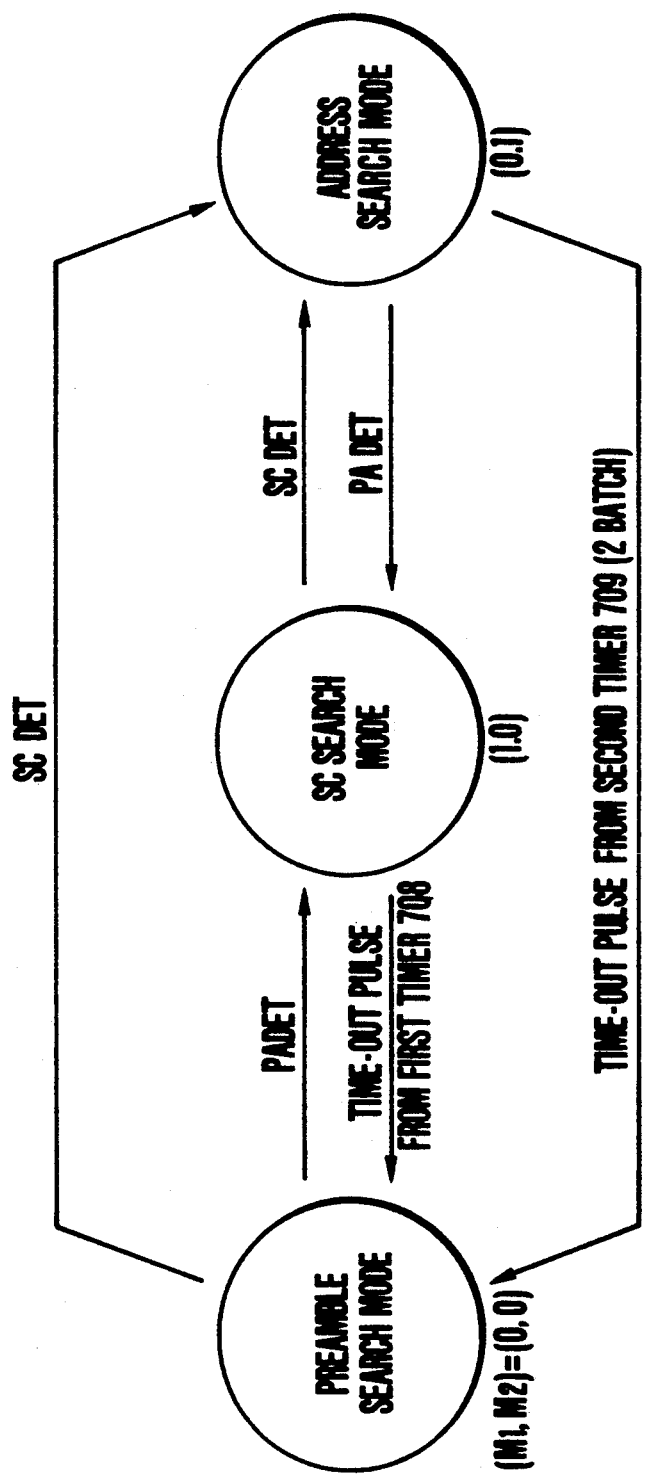
FIG. 12 is a state transition diagram of the three modes of a controller.

FIG. 12 is a state transition diagram of the three operation modes of the controller. More specifically, in the preamble search mode, the controller enters the SC search mode in response to the PADET pulse, and enters the address search mode in response to the SCDET pulse. In the SC search mode, the controller enters the address search mode in response to the SCDET pulse, and enters the preamble search mode in response to the time-out pulse from the first timer 708. In the address search mode, the controller enters the SC search mode in response to the PADET pulse, and enters the preamble search mode in response to the time-out pulse from the second timer 709.

Note that a relationship between the modes and the outputs M1 and M2 from the flip-flops 705 and 706 is given as follows:

|  | M1 | M2 |
| --- | --- | --- |
| Preamble CPA Search Mode | 0 | 0 |
| SC Search Mode | 1 | 0 |
| Address Search Mode | 0 | 1 |

What is claimed is:

1. A radio paging receiver which comprises a receiving station for intermittently receiving a paging signal including a preamble signal, a synchronization signal, and an address signal, a decoder section for processing signal demodulated by said receiving section, and an alert generator for generating an alert signal in response to the detection of an address signal assigned to said receiver, said decoder section including:

bit synchronization means for producing a clock synchronized with a received signal;

preamble detection means for detecting the preamble signal and outputting a preamble detection signal, said preamble detection means checking the preamble signal in at least two different phases of one period of said clock;

synchronization signal detection means for detecting the synchronization signal and outputting a synchronization signal detection signal;

address signal detection means for detecting said address signal assigned to said receiver and outputting an address detection signal; and reception control means responsive to the preamble detection signal and the synchronization signal detection signal for outputting a battery saving control signal controlling an intermittent reception operation of said receiver and a control signal controlling said bit synchronization means, said preamble detection means, said synchronization signal detection means, and said address detection means.

2. A paging receiver according to claim 1, wherein said preamble detection means comprises first and second preamble detection circuits, said first preamble detection circuit checking the preamble signal in one phase of the clock extracted by said bit synchronization means, and said second preamble detection circuit checking the preamble signal in a plurality of phases of the clock extracted by said bit synchronization means.

3. A paging receiver according to claim 2, wherein said first preamble detection circuit operates before the synchronization signal is detected, and said second preamble detection circuit operates after the synchronization signal is detected.

4. A paging receiver according to claim 2, wherein said first preamble detection circuit checks the presence/absence of the preamble signal for every bit, and wherein said second preamble detection circuit checks the presence/absence of the preamble signal in units of the number of bits of the address signal.

5. A paging receiver according to claim 1, wherein said bit synchronization means sets a larger time constant for the production of said clock by said bit synchronization means after the synchronization signal is detected than that before the synchronization signal is detected.

* * * * *